United States Patent
Mentovich et al.

(10) Patent No.: US 11,895,233 B2
(45) Date of Patent: Feb. 6, 2024

(54) QUANTUM KEY DISTRIBUTION ENABLED INTRA-DATACENTER NETWORK

(71) Applicant: Mellanox Technologies, Ltd., Yokneam (IL)

(72) Inventors: Elad Mentovich, Tel Aviv (IL); Ioannis (Giannis) Patronas, Piraeus (GR); Paraskevas Bakopoulos, Ilion (GR); Ahmad Atamlh, Oxford (GB)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 296 days.

(21) Appl. No.: 17/155,881

(22) Filed: Jan. 22, 2021

(65) Prior Publication Data

US 2022/0209942 A1 Jun. 30, 2022

(30) Foreign Application Priority Data

Dec. 28, 2020 (GR) .............................. 20200100753

(51) Int. Cl.
*H04L 9/08* (2006.01)
*H04Q 11/00* (2006.01)
*H04B 10/85* (2013.01)

(52) U.S. Cl.
CPC ........... *H04L 9/0852* (2013.01); *H04B 10/85* (2013.01); *H04Q 11/0071* (2013.01); *H04Q 2213/13339* (2013.01)

(58) Field of Classification Search
CPC ....... H04L 9/0852; H04B 10/85; H04B 10/70; H04Q 11/0071; H04Q 2213/13339
See application file for complete search history.

(56) References Cited

U.S. PATENT DOCUMENTS 9,077,577 B1   7/2015  Ashrafi et al.
9,356,780 B2   5/2016  Tanizawa
(Continued)

FOREIGN PATENT DOCUMENTS

CN    203912078 U    10/2014
CN    109217938 A    1/2019

OTHER PUBLICATIONS

Shor, Peter W.; "Algorithms for Quantum Computation: Discrete Logarithms and Factoring"; In: Proceedings, 35th Annual Symposium on Foundations of Computer Science, Santa Fe, NM; Nov. 20-22, 1994; IEEE Computer Society Press; pp. 124-134, 11 pages total.

(Continued)

*Primary Examiner* — Baotran N To
(74) *Attorney, Agent, or Firm* — Moore & Van Allen PLLC; Michael M. McCraw

(57) ABSTRACT

Embodiments are disclosed for a quantum key distribution (QKD) enabled intra-datacenter network. An example system includes a first QKD device and a second QKD device. The first QKD device includes a first quantum-enabled port and a first network port. The second QKD device includes a second quantum-enabled port and a second network port. The first quantum-enabled port of the first QKD device is communicatively coupled to the second quantum-enabled port of the second QKD device via a QKD link associated with quantum communication. Furthermore, the first network port of the first QKD device is communicatively coupled to a first network switch via a first classical link associated with classical network communication. The second network port of the second QKD device is communicatively coupled to a second network switch via a second classical link associated with classical network communication.

17 Claims, 13 Drawing Sheets

(56) References Cited

U.S. PATENT DOCUMENTS

| | | |
|---|---|---|
| 11,451,308 B1 | 9/2022 | Bucklew et al. |
| 11,611,195 B2 | 3/2023 | Berk et al. |
| 11,664,983 B2 | 5/2023 | Mentovich et al. |
| 11,711,210 B2 | 7/2023 | Syrivelis et al. |
| 2005/0078826 A1* | 4/2005 | Takeuchi .............. H04L 9/0838 380/255 |
| 2006/0013396 A1* | 1/2006 | Kollmitzer ............ H04L 9/0855 380/256 |
| 2008/0165957 A1 | 7/2008 | Kandasamy et al. |
| 2008/0175385 A1* | 7/2008 | Lee ..................... H04B 10/70 380/278 |
| 2008/0292095 A1* | 11/2008 | Vig ..................... H04B 10/70 380/2 |
| 2009/0180615 A1* | 7/2009 | Trifonov ................ H04B 10/70 380/278 |
| 2012/0177201 A1* | 7/2012 | Ayling .................. H04L 9/0858 380/278 |
| 2013/0101119 A1 | 4/2013 | Nordholt et al. |
| 2017/0214525 A1 | 7/2017 | Zhao et al. |
| 2019/0123847 A1* | 4/2019 | Bush ................... H04L 63/0227 |
| 2019/0379463 A1* | 12/2019 | Shields ................ H04L 9/0852 |
| 2021/0083864 A1* | 3/2021 | Bush ..................... H04L 9/088 |
| 2022/0006627 A1 | 1/2022 | Ko |
| 2023/0132571 A1 | 5/2023 | Bakopoulos et al. |
| 2023/0261860 A1 | 8/2023 | Mentovich et al. |
| 2023/0269075 A1 | 8/2023 | Bakopoulos et al. |

OTHER PUBLICATIONS

Office Action dated Nov. 30, 2022, in pending U.S. Appl. No. 17/227,321.

Notice of Allowance dated Mar. 14, 2023, in pending U.S. Appl. No. 17/227,321.

Septon et al., Pending Israeli Patent Application No. 298937, filed Dec. 8, 2022.

Septon et al., Pending Israeli Patent Application No. 298938, filed Dec. 8, 2022.

Septon et al., Pending Israeli Patent Application No. 299832, filed Jan. 11, 2023.

Chinese Office Action from corresponding Chinese Application No. 202111598609.X dated Nov. 30, 2023, 6 pages, with English Translation.

* cited by examiner

QUANTUM KEY DISTRIBUTION ENABLED INTRA-DATACENTER NETWORK

CROSS-REFERENCE TO RELATED APPLICATIONS

This application claims the benefit of Greek Patent Application No. 20200100753, filed Dec. 28, 2020, which is hereby incorporated herein by reference in its entirety.

TECHNOLOGICAL FIELD

Embodiments of the present invention relate generally to a quantum key distribution enabled intra-datacenter network.

BACKGROUND

Traditional key exchange protocols used in datacenter networks (e.g., a Diffie-Hellman key exchange protocol, a Rivest-Shamir-Adleman (RSA) key exchange protocol, etc.) generally rely on computational complexity of the associated algorithm for the exchange protocol to encrypt data. However, with tradition key exchange protocols, security vulnerabilities still exist for a datacenter system. For example, with tradition key exchange protocols, it is possible to obtain unauthorized access to a datacenter system provided that adequate processing power is available to an unauthorized device. With the advent of quantum computers, the availability of processing power is expected to scale exponentially. As such, operational quantum computers are expected to be capable of hacking traditional encryption related to tradition key exchange protocols within a realistic timeframe, giving rise to an increased security threat for datacenter systems.

BRIEF SUMMARY

Example embodiments of the present invention relate generally to system(s), method and apparatus to facilitate a quantum key distribution enabled intra-datacenter network. The details of some embodiments of the subject matter described in this specification are set forth in the accompanying drawings and the description below. Other features, aspects, and advantages of the subject matter will become apparent from the description, the drawings, and the claims.

In an embodiment, a system comprises a first quantum key distribution (QKD) device and a second QKD device. The first QKD device comprises a first quantum-enabled port and a first network port. The second QKD device comprises a second quantum-enabled port and a second network port. In this embodiment, the first quantum-enabled port of the first QKD device is communicatively coupled to the second quantum-enabled port of the second QKD device via a QKD link associated with quantum communication. Furthermore, in this embodiment, the first network port of the first QKD device is communicatively coupled to a first network switch via a first classical link associated with classical network communication. Additionally, in this embodiment, the second network port of the second QKD device is communicatively coupled to a second network switch via a second classical link associated with classical network communication.

In some embodiments, the QKD link is a first QKD link. Furthermore, in some embodiments, the system further comprises a third QKD device that comprises a third quantum-enabled port and a third network port. In this embodiment, the third quantum-enabled port of the third QKD device is communicatively coupled to the first QKD device or the second QKD device via a second QKD link associated with quantum communication.

In some embodiments, the QKD link is a first QKD link. Furthermore, in some embodiments, the system further comprises a third QKD device and a fourth QKD device. In this embodiment, the third QKD device comprises a third quantum-enabled port and a third network port. Additionally, in this embodiment, the third quantum-enabled port of the third QKD device is communicatively coupled to the first QKD device via a second QKD link associated with quantum communication. In this embodiment, the fourth QKD device comprises a fourth quantum-enabled port and a fourth network port. Additionally, in this embodiment, the fourth quantum-enabled port of the fourth QKD device is communicatively coupled to the second QKD device via a third QKD link associated with quantum communication.

In some embodiments, the QKD link comprises a first QKD link and a second QKD link. In this embodiment, the first quantum-enabled port of the first QKD device is communicatively coupled to an optical switch via a the first QKD link. Furthermore, in this embodiment, the optical switch is communicatively coupled to the second quantum-enabled port of the second QKD device via the second QKD link.

In some embodiments, the QKD link comprises a first QKD link and a second QKD link. In this embodiment, the first quantum-enabled port of the first QKD device is communicatively coupled to a first optical switch via a the first QKD link. Additionally, in this embodiment, the first optical switch is communicatively coupled to a second optical switch. Additionally, in this embodiment, the second optical switch is communicatively coupled to the second quantum-enabled port of the second QKD device via the second QKD link.

In some embodiments, the first QKD device is a first QKD-enabled top of rack (ToR) switch. Furthermore, in this embodiment, the second QKD device is a second QKD-enabled ToR switch.

In some embodiments, the first QKD device is a first QKD-enabled end of rack (EoR) switch. Furthermore, in this embodiment, the second QKD device is a second QKD-enabled EoR switch.

In another embodiment, a system comprises a first QKD switch and a second QKD switch. The first QKD switch comprises a first quantum-enabled port. The second QKD switch comprises a second quantum-enabled port. In this embodiment, the first quantum-enabled port of the first QKD switch is communicatively coupled to the second quantum-enabled port of the second QKD switch via a QKD link associated with quantum communication. Furthermore, in this embodiment, the first QKD switch comprises first QKD hardware and the second QKD switch comprises second QKD hardware configured to facilitate the quantum communication via the QKD link.

In some embodiments, the QKD link is a first QKD link. Furthermore, in some embodiments, the system further comprises a third QKD switch that comprises a third quantum-enabled port. In this embodiment, the third quantum-enabled port of the third QKD switch is communicatively coupled to the first QKD switch or the second QKD switch via a second QKD link associated with quantum communication.

In some embodiments, the QKD link is a first QKD link. Furthermore, in some embodiments, the system further comprises a third QKD switch and a fourth QKD switch. In this embodiment, the third QKD switch comprises a third quantum-enabled port. Additionally, in this embodiment, the third quantum-enabled port of the third QKD switch is communicatively coupled to the first QKD switch via a second QKD link associated with quantum communication. In this embodiment, the fourth QKD switch comprises a fourth quantum-enabled port. Additionally, in this embodiment, the fourth quantum-enabled port of the fourth QKD switch is communicatively coupled to the second QKD switch via a third QKD link associated with quantum communication.

In some embodiments, the QKD link comprises a first QKD link and a second QKD link. In this embodiment, the first quantum-enabled port of the first QKD switch is communicatively coupled to an optical switch via a the first QKD link. Furthermore, in this embodiment, the optical switch is communicatively coupled to the second quantum-enabled port of the second QKD switch via the second QKD link.

In some embodiments, the QKD link comprises a first QKD link and a second QKD link. In this embodiment, the first quantum-enabled port of the first QKD switch is communicatively coupled to a first optical switch via a the first QKD link. Furthermore, in this embodiment, the first optical switch is communicatively coupled to a second optical switch. Additionally, in this embodiment, the second optical switch is communicatively coupled to the second quantum-enabled port of the second QKD switch via the second QKD link.

In some embodiments, the first QKD switch is a first QKD-enabled ToR switch. In this embodiment, the second QKD switch is a second QKD-enabled ToR switch.

In some embodiments, the first QKD switch is a first QKD-enabled EoR switch. In this embodiment, the second QKD switch is a second QKD-enabled EoR switch.

In yet another embodiment, a system comprises a first QKD device, a second QKD device, and a network switch. The first QKD device comprises a first quantum-enabled port. The second QKD device comprises a second quantum-enabled port. In this embodiment, the first quantum-enabled port of the first QKD device is communicatively coupled to the second quantum-enabled port of the second QKD device via a QKD link associated with quantum communication. Furthermore, the network switch communicatively is coupled to the first QKD device via a classical link associated with classical network communication. In this embodiment, the first QKD device is configured to manage a QKD protocol for the quantum communication. Furthermore, in this embodiment, the network switch is configured to manage the classical network communication.

In some embodiments, the QKD link is a first QKD link. In this embodiment, the system further comprises a third QKD device that comprises a third quantum-enabled port. In this embodiment, the third quantum-enabled port of the third QKD device is communicatively coupled to the first QKD device or the second QKD device via a second QKD link associated with quantum communication.

In some embodiments, the QKD link is a first QKD link. Furthermore, in some embodiments, the system further comprises a third QKD device and a fourth QKD device. In this embodiment, the third QKD device comprises a third quantum-enabled port. Furthermore, in this embodiment, the third quantum-enabled port of the third QKD device is communicatively coupled to the first QKD device via a second QKD link associated with quantum communication. Additionally, in this embodiment, the fourth QKD device comprises a fourth quantum-enabled port. Furthermore, in this embodiment, the fourth quantum-enabled port of the fourth QKD device is communicatively coupled to the second QKD device via a third QKD link associated with quantum communication.

In some embodiments, the QKD link comprises a first QKD link and a second QKD link. In this embodiment, the first quantum-enabled port of the first QKD device is communicatively coupled to an optical switch via a the first QKD link. Furthermore, in this embodiment, the optical switch is communicatively coupled to the second quantum-enabled port of the second QKD device via the second QKD link.

In some embodiments, the QKD link comprises a first QKD link and a second QKD link. In this embodiment, the first quantum-enabled port of the first QKD device is communicatively coupled to a first optical switch via a the first QKD link. Furthermore, in this embodiment, the first optical switch is communicatively coupled to a second optical switch, and wherein the second optical switch is communicatively coupled to the second quantum-enabled port of the second QKD device via the second QKD link.

In some embodiments, the network switch is a first network switch. Furthermore, in some embodiments, the classical link is a first classical link. In this embodiment, the system further comprises a second network switch communicatively coupled to the second QKD device via a second classical link associated with classical network communication.

The above summary is provided merely for purposes of summarizing some example embodiments to provide a basic understanding of some aspects of the present invention. Accordingly, it will be appreciated that the above-described embodiments are merely examples and should not be construed to narrow the scope or spirit of the present invention in any way. It will be appreciated that the scope of the present invention encompasses many potential embodiments in addition to those here summarized, some of which will be further described below.

BRIEF DESCRIPTION OF THE DRAWINGS

Figure 1:
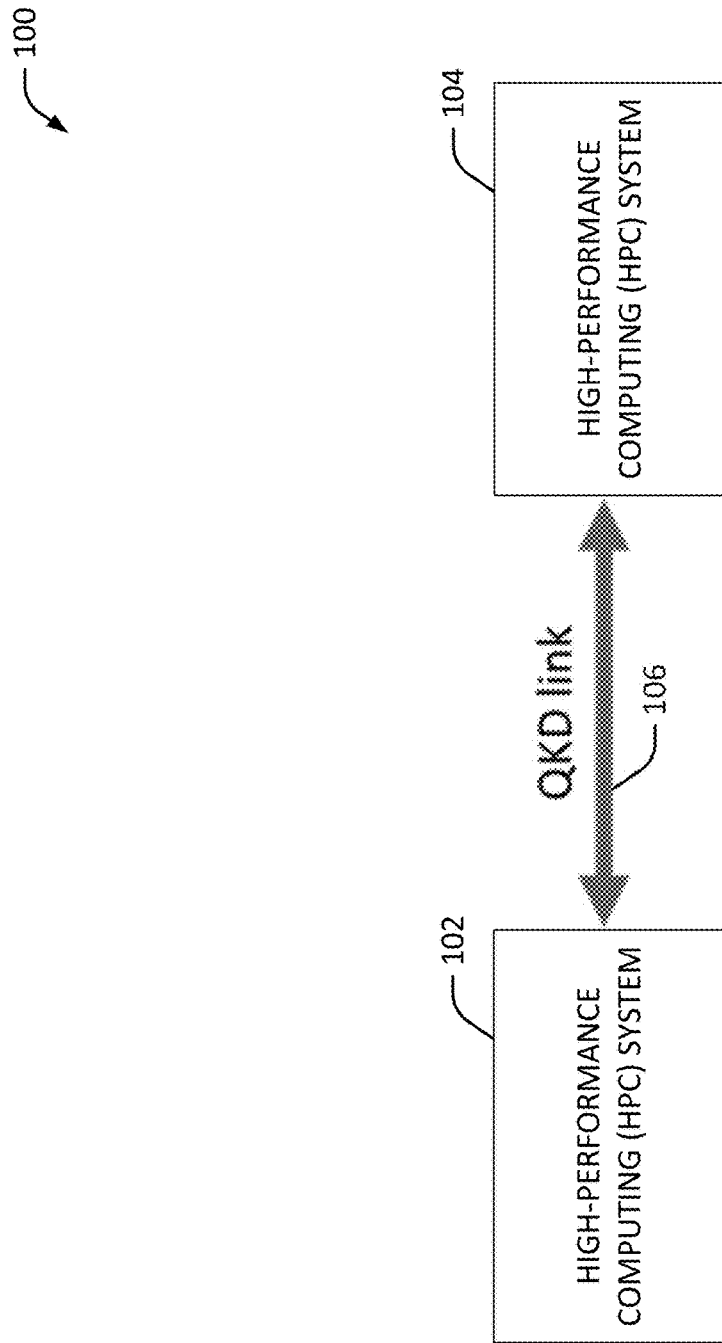
Figure 2:
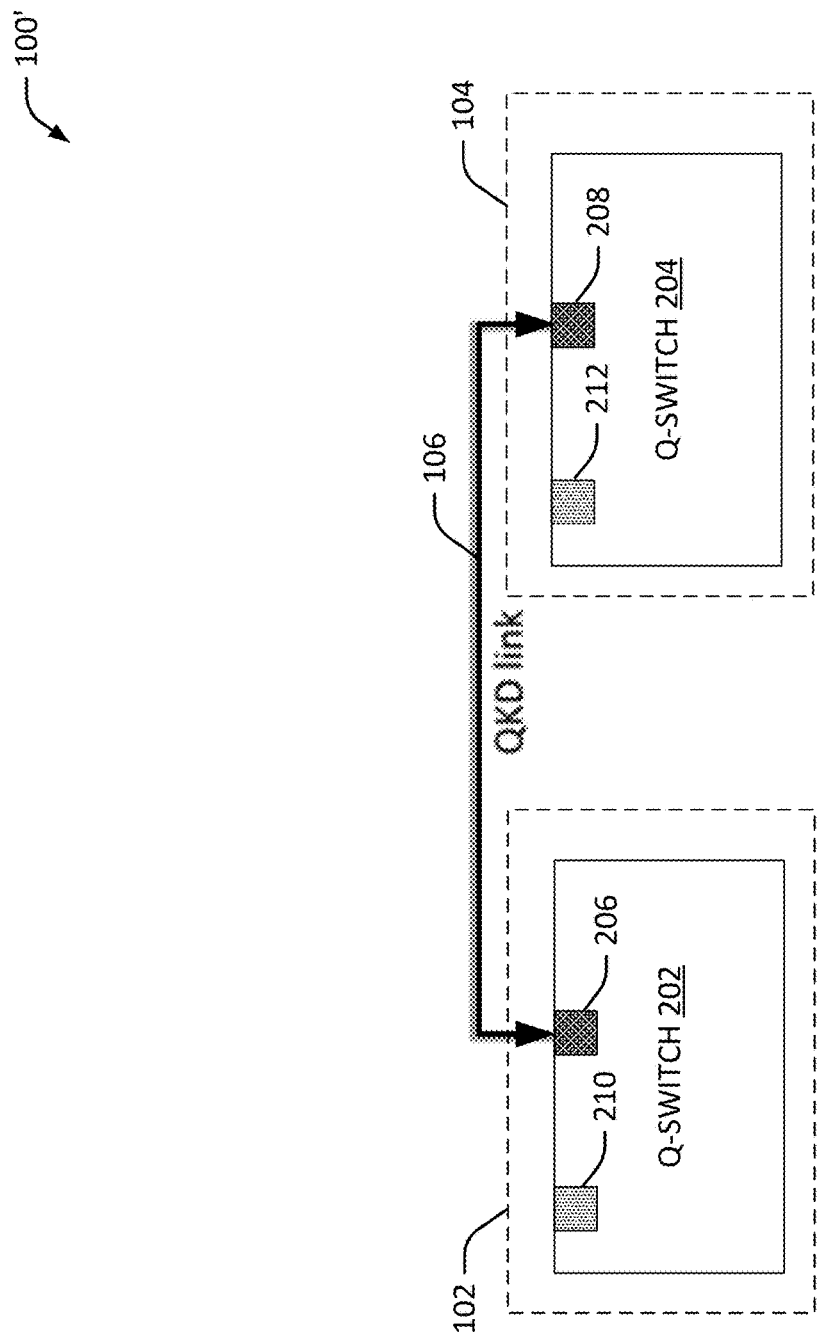
Figure 3:
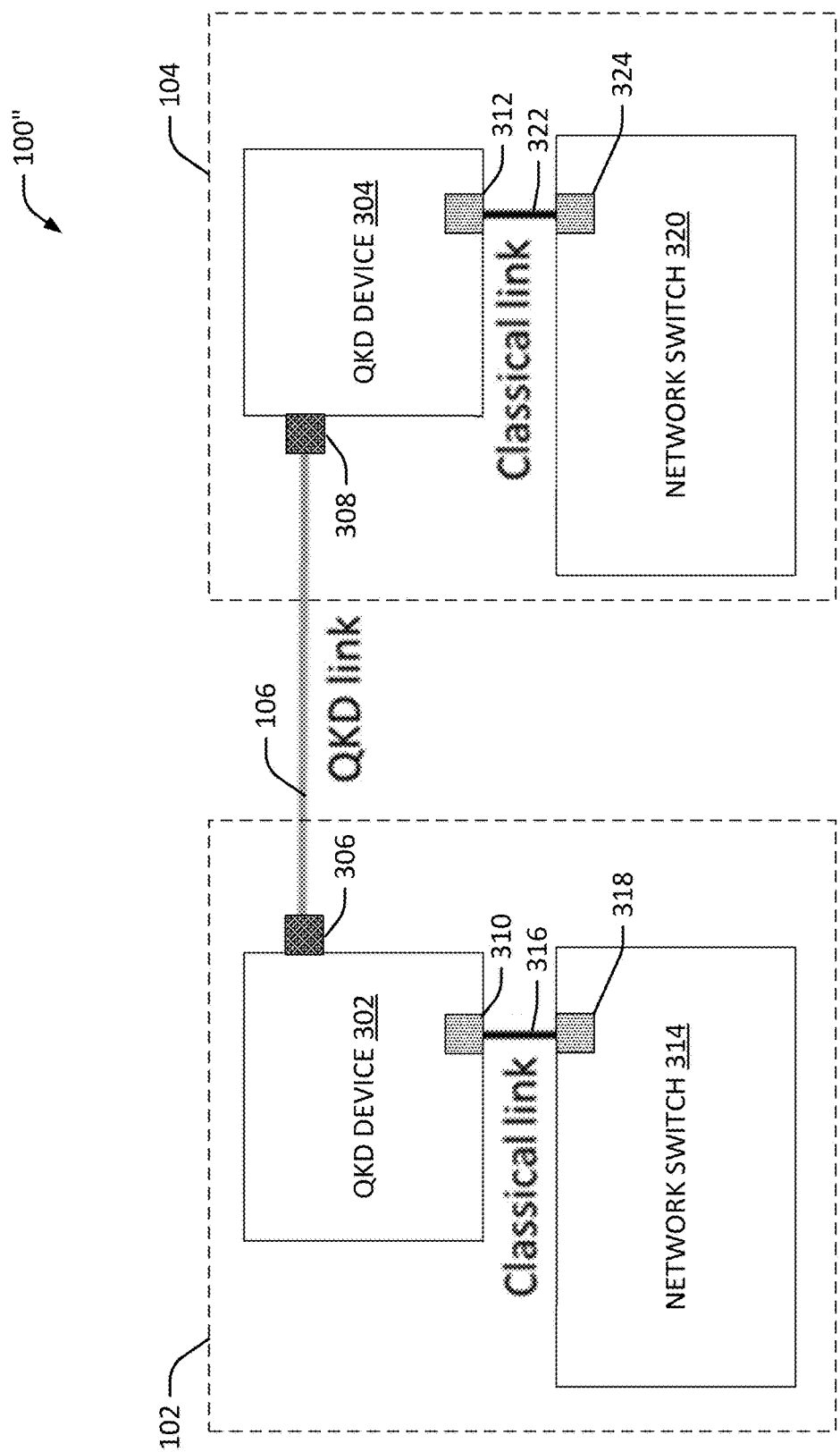
Figure 4:
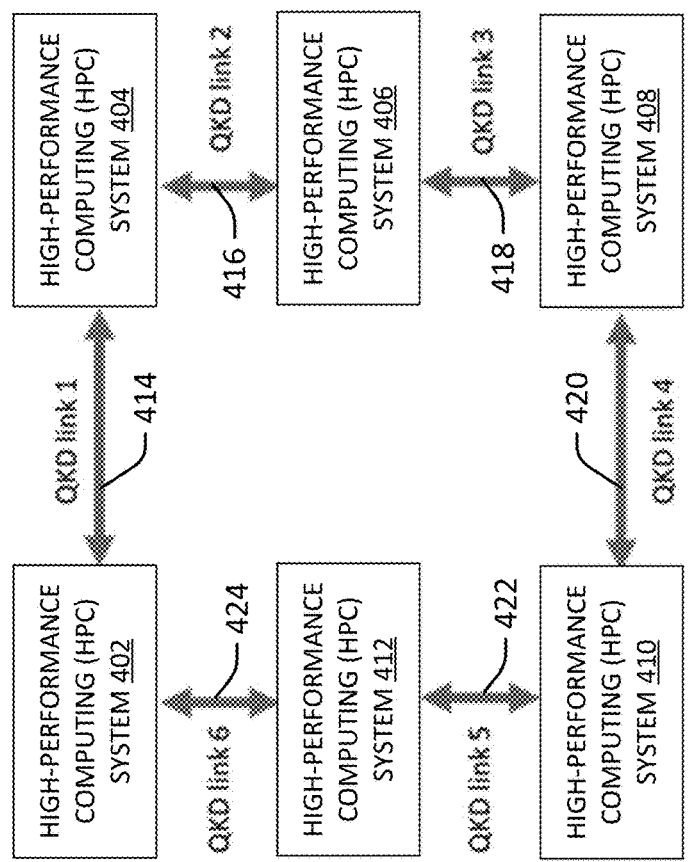
Figure 5:
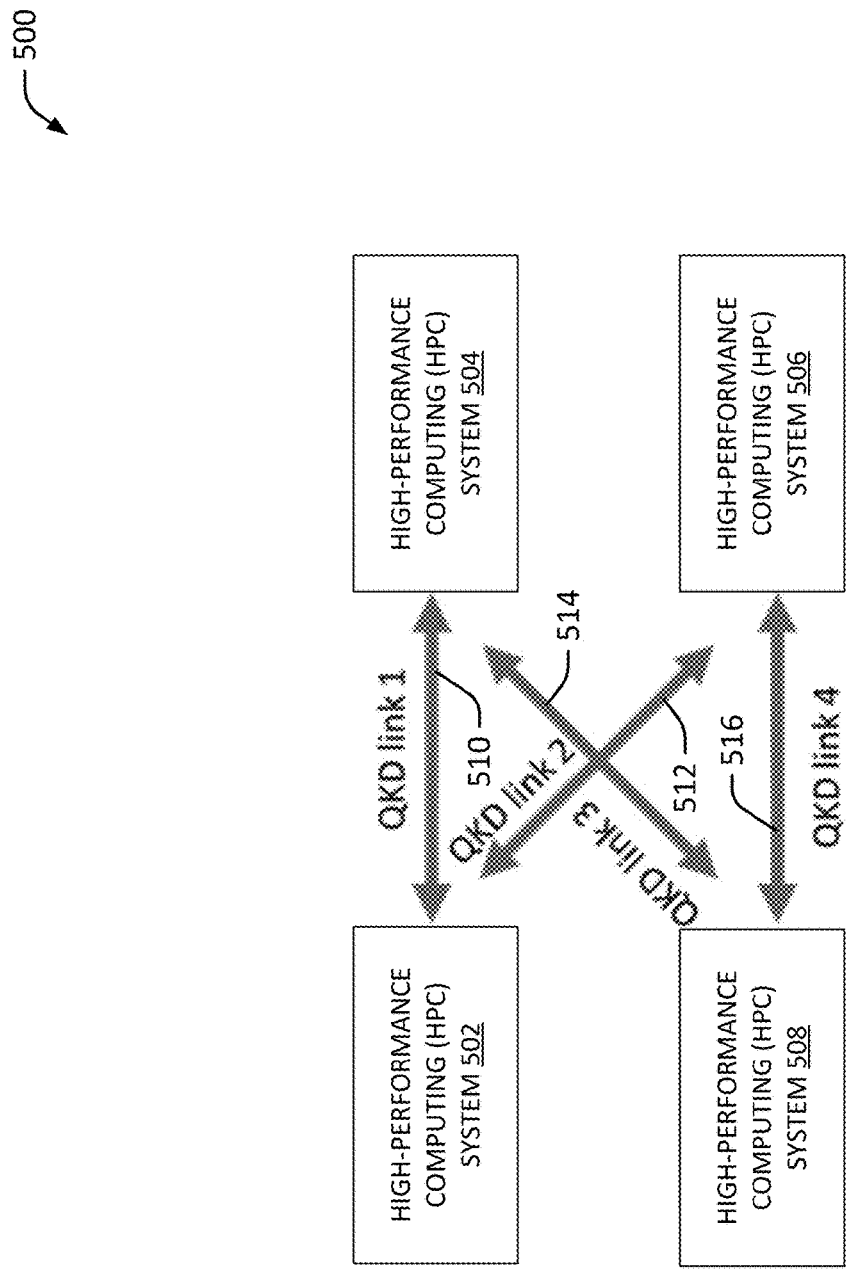
Figure 6:
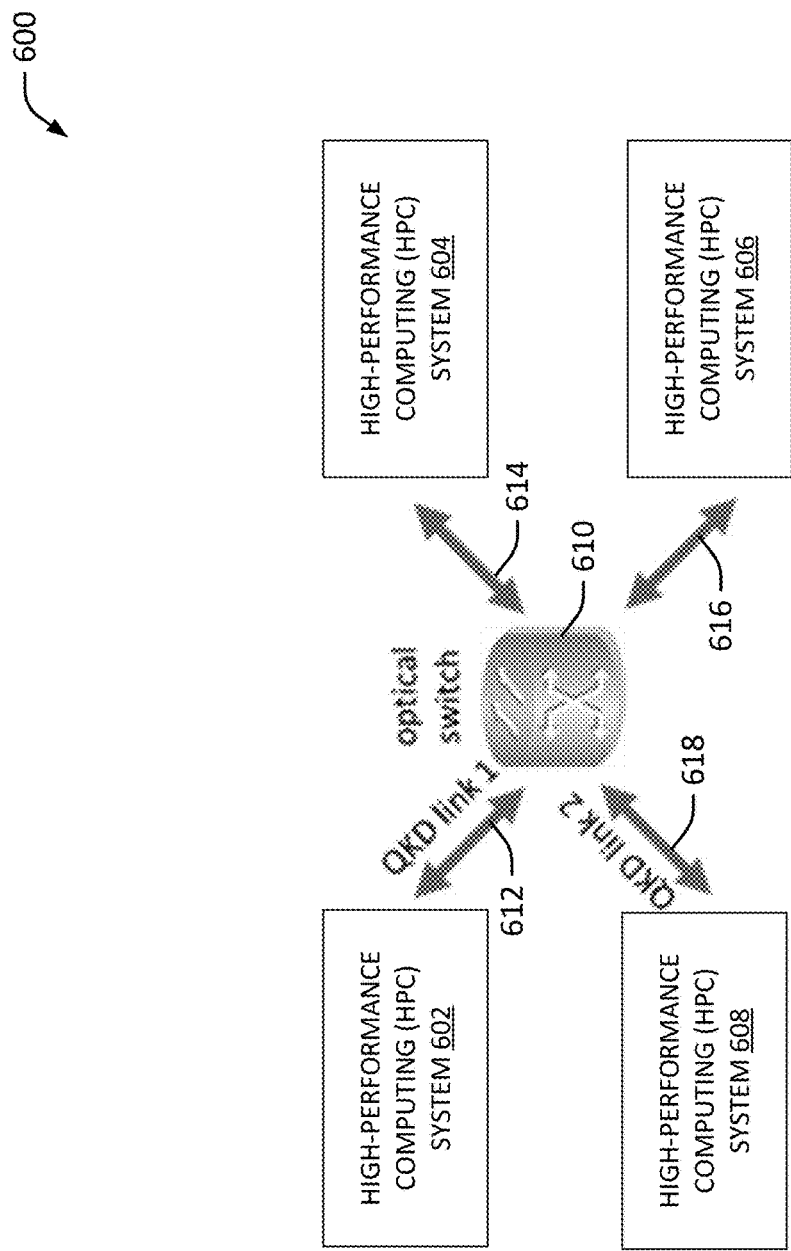
Figure 7:
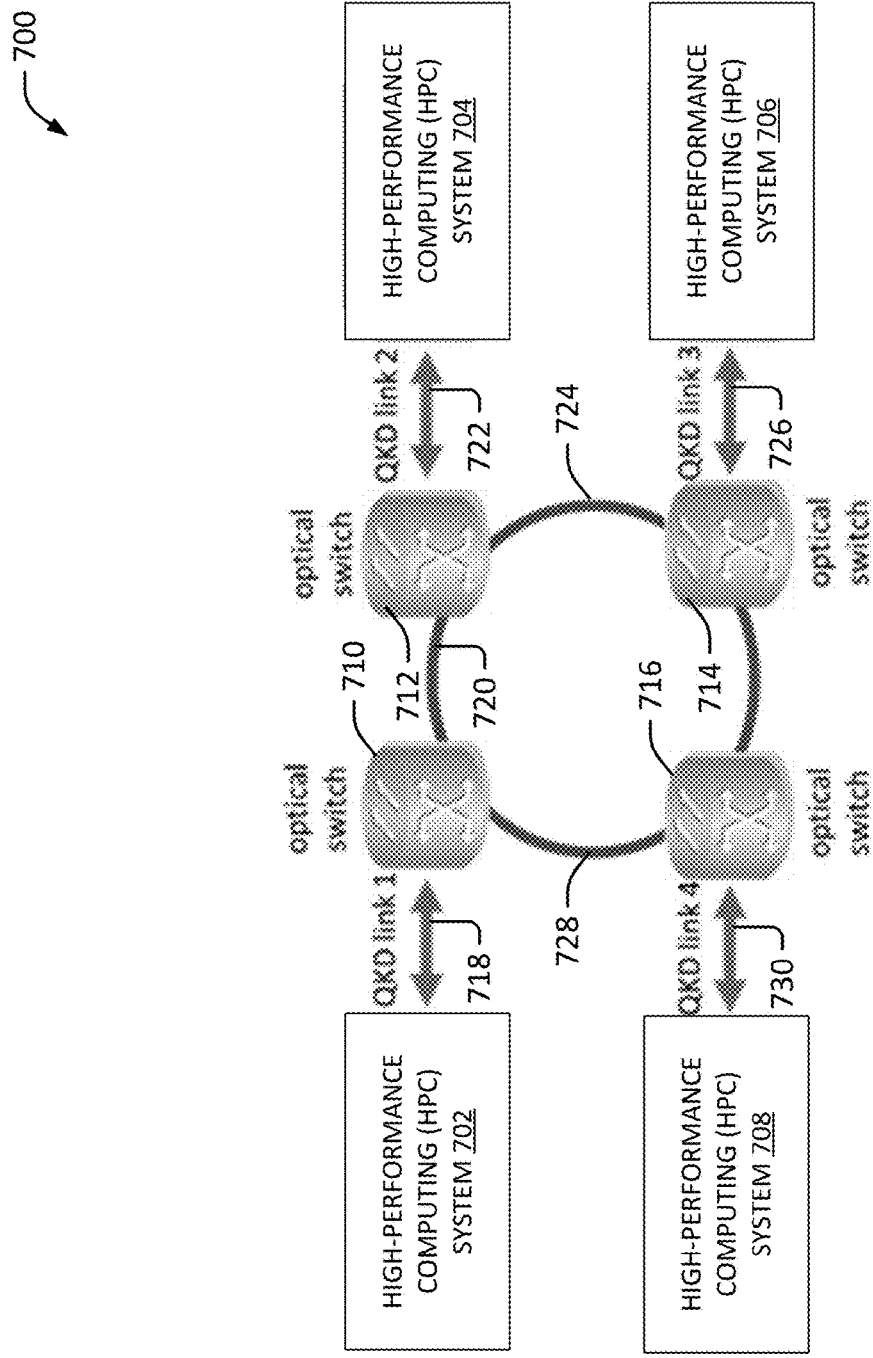
Figure 8:
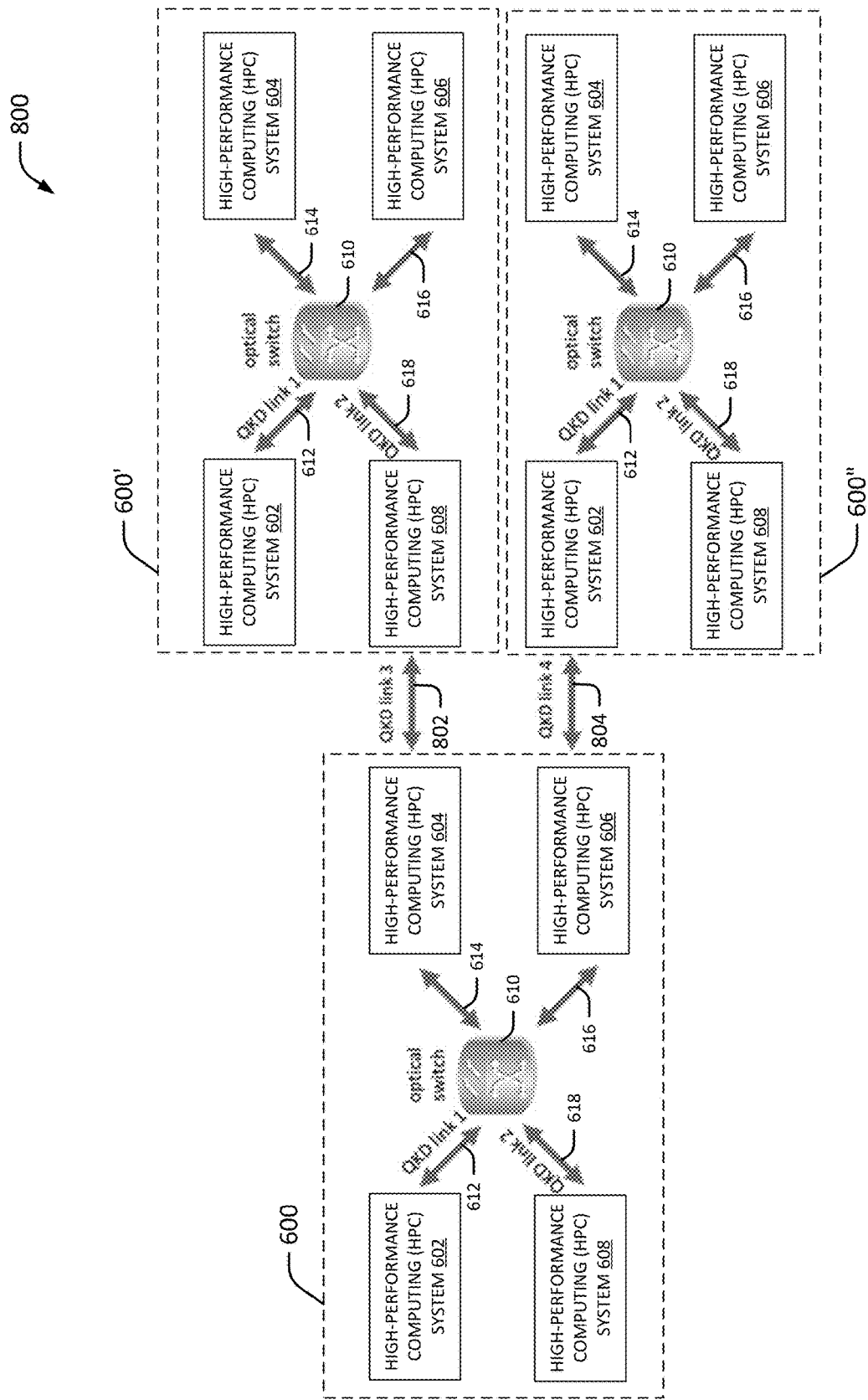
Figure 9:
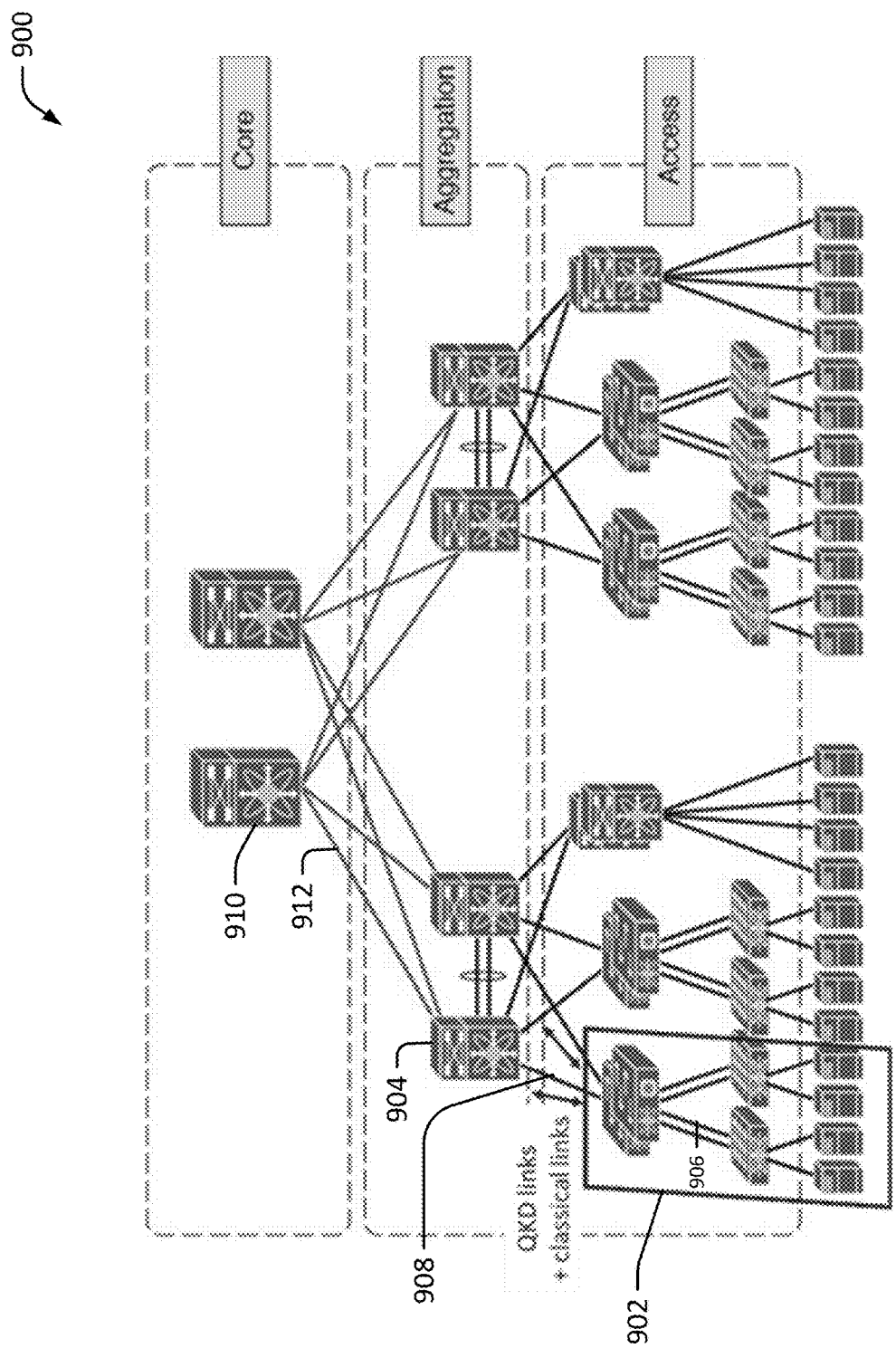
Figure 10:
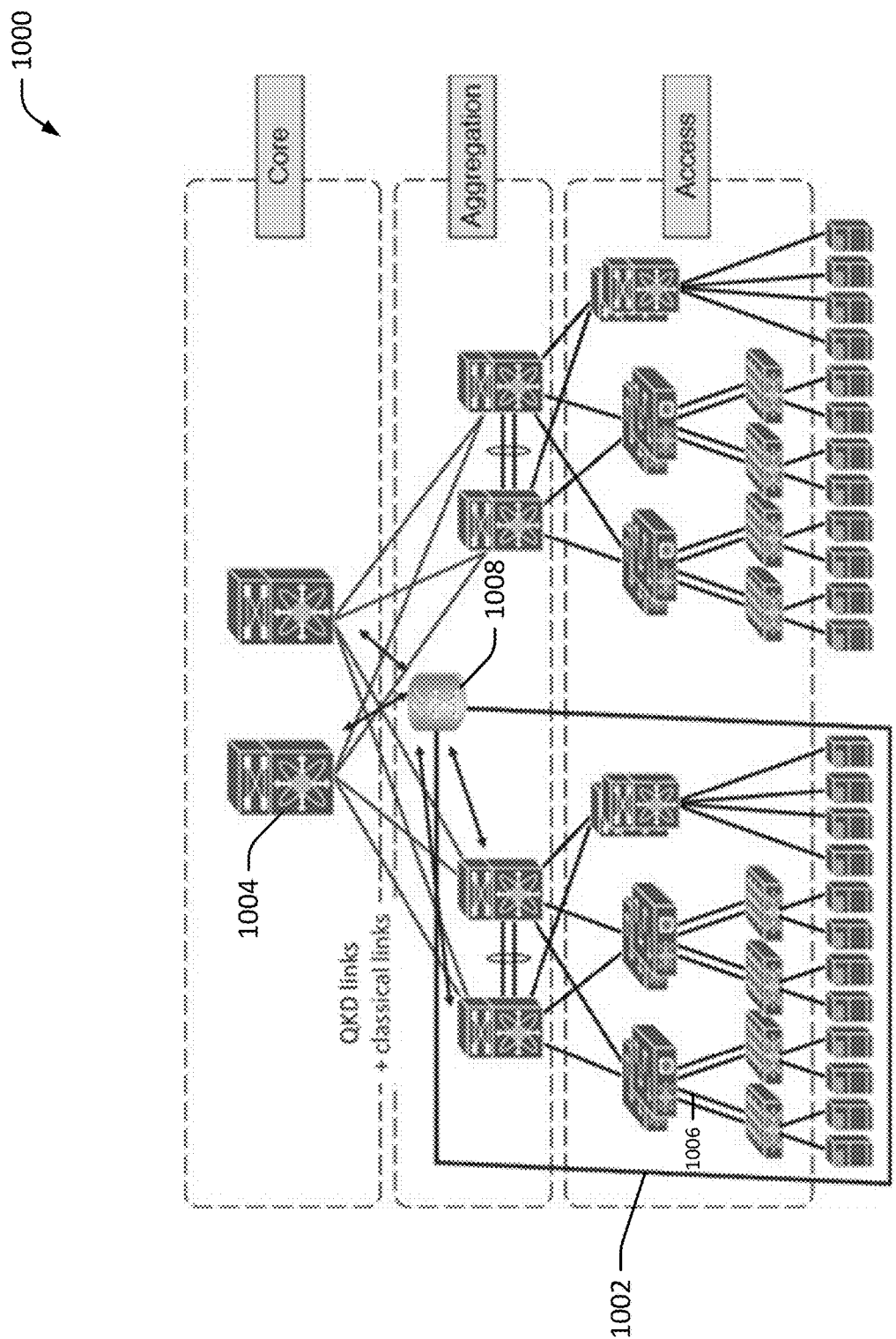
Figure 11:
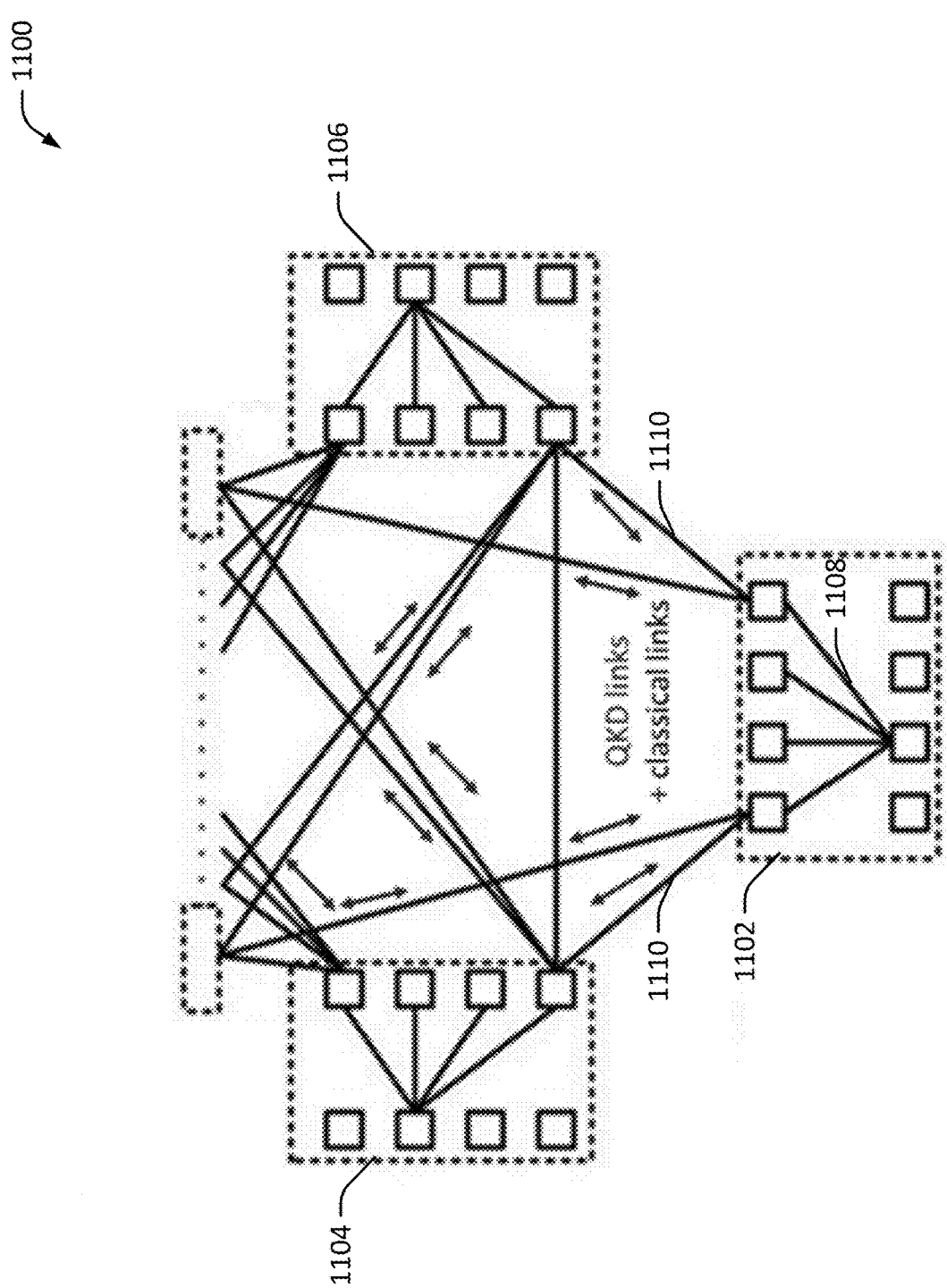
Figure 12:
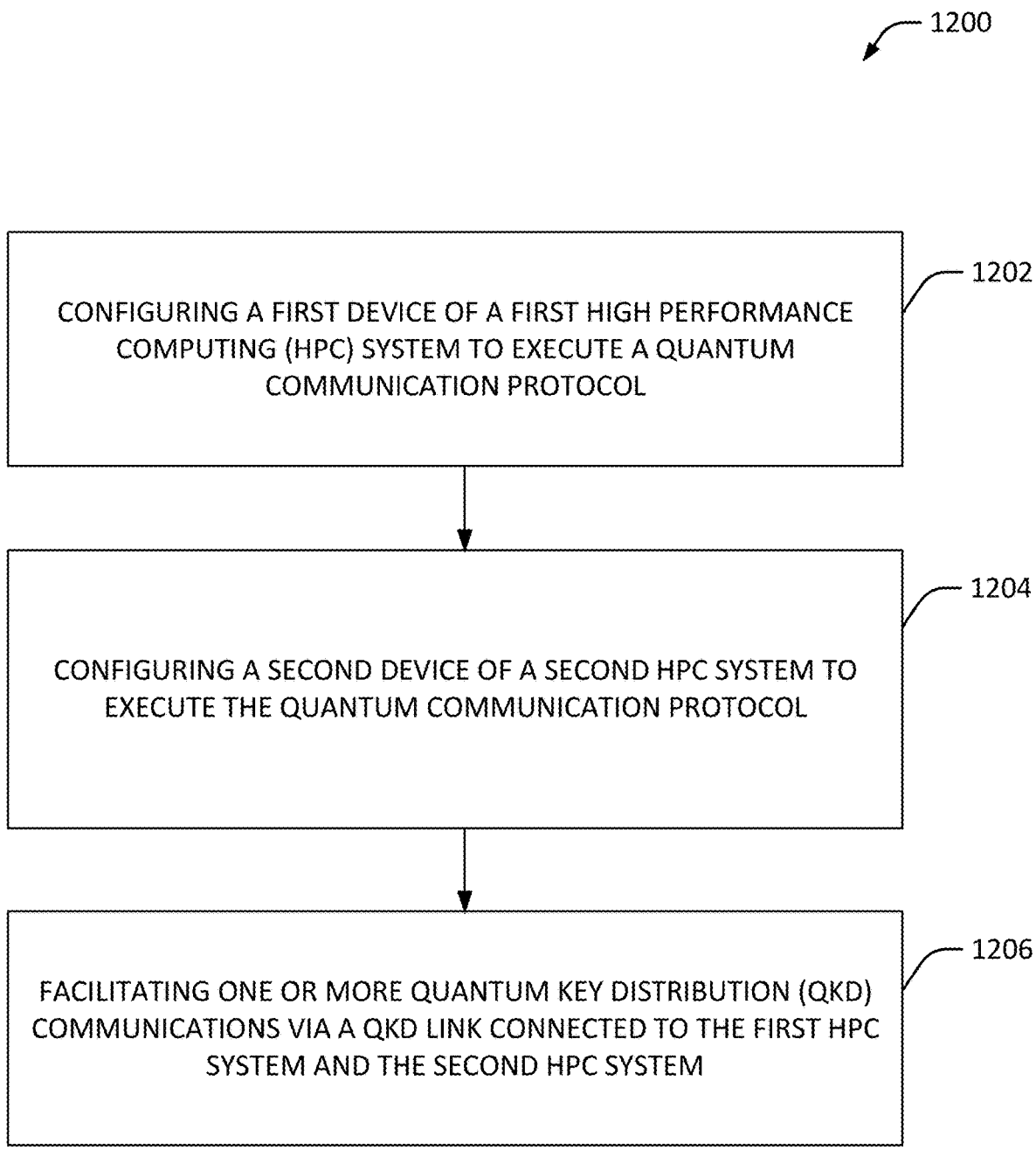
Figure 13:
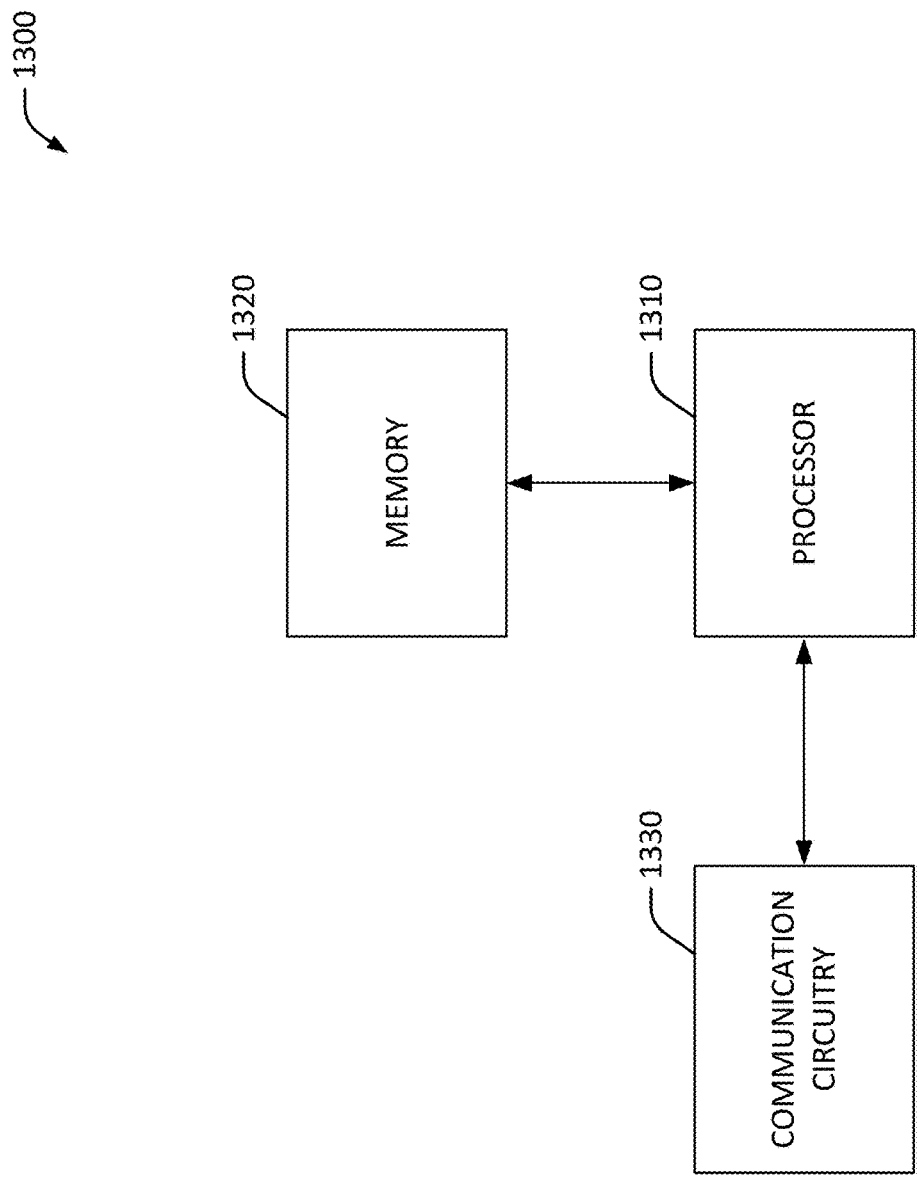

Having thus described the disclosure in general terms, reference will now be made to the accompanying drawings, which are not necessarily drawn to scale, and wherein:

FIG. 1 illustrates an exemplary system that facilitates a quantum key distribution (QKD) enabled intra-datacenter network, in accordance with one or more embodiments of the present disclosure;

FIG. 2 illustrates another exemplary system that facilitates a QKD enabled intra-datacenter network, in accordance with one or more embodiments of the present disclosure;

FIG. 3 illustrates yet another exemplary system that facilitates a QKD enabled intra-datacenter network, in accordance with one or more embodiments of the present disclosure;

FIG. 4 illustrates an exemplary system that facilitates QKD connectivity between more than two high performance computing (HPC) systems, in accordance with one or more embodiments of the present disclosure;

FIG. 5 illustrates another exemplary system that facilitates QKD connectivity between more than two HPC systems, in accordance with one or more embodiments of the present disclosure;

FIG. 6 illustrates yet another exemplary system that facilitates QKD connectivity between more than two HPC systems, in accordance with one or more embodiments of the present disclosure;

FIG. 7 illustrates yet another exemplary system that facilitates QKD connectivity between more than two HPC systems, in accordance with one or more embodiments of the present disclosure;

FIG. 8 illustrates yet another exemplary system that facilitates QKD connectivity between more than two HPC systems, in accordance with one or more embodiments of the present disclosure;

FIG. 9 illustrates an exemplary system that facilitates QKD communication via a fat-tree datacenter architecture, in accordance with one or more embodiments of the present disclosure;

FIG. 10 illustrates another exemplary system that facilitates QKD communication via a fat-tree datacenter architecture, in accordance with one or more embodiments of the present disclosure;

FIG. 11 illustrates an exemplary system that facilitates QKD communication via a dragonfly datacenter topology, in accordance with one or more embodiments of the present disclosure;

FIG. 12 is a flowchart illustrating an example method for facilitating quantum key distribution, in accordance with one or more embodiments of the present disclosure; and FIG. 13 illustrates an example computing system that may be embedded in the communication system, in accordance with one or more embodiments of the present disclosure.

DETAILED DESCRIPTION

Example embodiments will now be described more fully hereinafter with reference to the accompanying drawings, in which some, but not all, embodiments are shown. Indeed, the embodiments may take many different forms and should not be construed as limited to the embodiments set forth herein; rather, these embodiments are provided so that this disclosure will satisfy applicable legal requirements. Like reference numerals refer to like elements throughout. The terms "exemplary" and "example" as may be used herein are not provided to convey any qualitative assessment, but instead merely to convey an illustration of an example. Thus, use of any such terms should not be taken to limit the spirit and scope of embodiments of the present invention.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Traditional key exchange protocols used in datacenter networks (e.g., a Diffie-Hellman key exchange protocol, a Rivest-Shamir-Adleman (RSA) key exchange protocol, etc.) generally rely on computational complexity of the associated algorithm for the exchange protocol to encrypt data. However, with tradition key exchange protocols, security vulnerabilities still exist for a datacenter system. For example, with tradition key exchange protocols, it is possible to obtain unauthorized access to a datacenter system provided that adequate processing power is available to an unauthorized device. An unauthorized access to a datacenter system can include, for example, a security vulnerability with respect to hardware (e.g., unauthorized access to fiber links, etc.) and/or a security vulnerability with respect to software (e.g., unauthorized access to data in a collocation facility, etc.). With the advent of quantum computers, the availability of processing power is expected to scale exponentially. As such, operational quantum computers are expected to be capable of hacking traditional encryption related to tradition key exchange protocols within a realistic timeframe, giving rise to an increased security threat for datacenter systems.

In an implementation, post-quantum encryption algorithms can be employed to provide improved security for a datacenter system. Post-quantum algorithms generally rely on the fact that there is no known way to solve the post quantum algorithms within a realistic timeframe using a quantum computer. However, post-quantum algorithms generally employ complex processing with increased hardware at a host system. In another implementation, Quantum Key Distribution (QKD) can be employed to provide improved security for a datacenter system. QKD is a technology that offers information theoretic security, which renders it inherently unhackable. In an aspect, QKD technology is based on dedicated optical hardware that alleviates processing requirements imposed, for example, by post-quantum algorithms. QKD technology generally employs specialized optical components and/or dedicated optical paths. However, it is generally not economically viable to deploy QKD technology in every network interface controller or every network switch within a datacenter network.

Thus, to address these and/or other issues, a quantum key distribution enabled intra-datacenter network is disclosed herein. For instance, the system architecture disclosed herein provides deployment of QKD technology in a datacenter network. As such, by employing the QKD technology, datacenter connections can be provided with technological benefits such as, for example, improved security (e.g., to provide information-theoretic security for a datacenter network, etc.), improved performance, improved efficiency, reduced processing load for a host system, and/or one or more other technological benefits. According to one or more embodiments, the system architecture disclosed herein provides deployment of QKD links inside a datacenter network. For instance, according to one or more embodiments, the system architecture disclosed herein can employ one or more QKD-enabled switches and/or one or more QKD links inside a datacenter network. In an embodiment, a QKD link can facilitate transferring one or more keys via quantum communication.

According to various embodiments, a QKD-enabled switch can interface with QKD electro-optical hardware configured to facilitate separation of classical data channels (e.g., classical data channels attached to one or more other ports of the QKD-enabled switch) from quantum data channels (e.g., quantum data channels attached to one or more dedicated hardware such as an encrypting device or a custom network interface controller). According to one or more embodiments, a QKD-enabled switch (e.g., a source QKD-enabled switch) can receive one or more key exchange requests from one or more servers to facilitate establishing secure communication with one or more other servers communicatively coupled to one or more other network switches. In an embodiment where a QKD-enabled switch includes encryption capabilities, the QKD-enabled switch can additionally employ one or more keys for switch-to-switch encryption. Furthermore, according to one or more embodiments, each source QKD-enabled switch can exchange one or more keys with the one or more destination QKD-enabled switches. According to one or more embodiments, a QKD-enabled switch can transmit one or more private keys to the servers. Additionally or alternatively, according to one or more embodiments, a QKD-enabled switch can employ one or more private keys for encrypting specific flows of data.

According to one or more embodiments, hardware and/or intelligence to facilitate QKD technology can be implemented on a QKD-enabled switch. For example, according to one or more embodiments, hardware and/or intelligence to facilitate QKD technology can be implemented on one or more ports of a QKD-enabled switch. Alternatively, according to one or more embodiments, hardware and/or intelligence to facilitate QKD technology can be implemented on a QKD device that is communicatively coupled to a legacy network switch via a QKD link. For example, according to one or more embodiments, a QKD device can be communicatively coupled to a datapath port of a legacy network switch, a management port of a legacy network switch, or another port of a legacy network switch via a QKD link. Moreover, as compared to conventional key exchange protocols, embodiments disclosed herein provide for improved security for a datacenter network, improved performance for a datacenter network, and/or improved efficiency for a datacenter network.

FIG. 1 illustrates a system 100 that facilitates a quantum key distribution enabled intra-datacenter network according to one or more embodiments of the present disclosure. For instance, in one or more embodiments, the system 100 implements QKD communication at a room level of a datacenter network. The system 100 includes a high-performance computing (HPC) system 102 and an HPC system 104. The HPC system 102 can be a computing system (e.g., a supercomputer) that processes data at an increased level of performance as compared to a general-purpose computing system. For example, the HPC system 102 can process data in accordance with floating-point operations per second (FLOPS) computational speed and/or parallel processing. Furthermore, the HPC system 104 can be a different computing system (e.g., a different supercomputer) that processes data at an increased level of performance as compared to a general-purpose computing system. For example, the HPC system 104 can also process data in accordance with FLOPS computational speed and/or parallel processing. In an embodiment, the HPC system 102 can process a first set of workloads and the HPC system 104 can process a second set of workloads. According to various embodiments, the HPC system 102 can be a first HPC room in a datacenter network and the HPC system 104 can be a second HPC room in a datacenter network. For instance, the HPC system 102 can include a first set of processor cores and/or a first plurality of server routers communicatively coupled via a first set of classical data links (e.g., classical data channels). Furthermore, the HPC system 104 can include a second set of processor cores and/or a second plurality of server routers communicatively coupled via a second set of classical data links (e.g., classical data channels).

The HPC system 102 can be communicatively coupled to the HPC 104 via a QKD link 106. The QKD link 106 is, for example, a quantum data channel associated with quantum communication. For example, the QKD link 106 can transmit data via quantum bits (qubits). In one or more embodiments, the QKD link 106 is an optical communication channel (e.g., a transparent fiber optical connection). According to one or more embodiments, the QKD link 106 can form a connection between QKD electro-optical hardware of the HPC system 102 and QKD electro-optical hardware of the HPC system 104. Furthermore, according to various embodiments, the QKD link 106 can be separate from the first set of classical data links within the HPC system 102 and the second set of classical data links within the HPC system 104. According to one or more embodiments, the HPC system 102 and the HPC system 104 can exchange one or more keys (e.g., one or more secure keys) via the QKD link 106.

FIG. 2 illustrates a system 100' that facilitates a quantum key distribution enabled intra-datacenter network according to one or more embodiments of the present disclosure. The system 100' illustrates an exemplary embodiment associated with the system 100. The system 100' includes the HPC system 102 and the HPC system 104. In an embodiment, the HPC system 102 includes a Q-switch 202 and the HPC system 104 includes a Q-switch 204. The Q-switch 202 is, for example, a QKD device (e.g., a QKD switch, a QKD-enabled switch, etc.) of the HPC system 102. Furthermore, the Q-switch 204 is, for example, a QKD device (e.g., a QKD switch, a QKD-enabled switch, etc.) of the HPC system 104. In one example, the Q-switch 202 can be a first QKD-enabled top of rack (ToR) switch and the Q-switch 204 can be a second QKD-enabled ToR switch. In another example, the Q-switch 202 can be a first QKD-enabled end of rack (EoR) switch and the Q-switch 204 can be a second QKD-enabled EoR switch. However, it is to be appreciated that, in one or more alternate embodiments, the Q-switch 202 and/or the Q-switch 204 can be different types of QKD-enabled switch with respect to each other.

According to one or more embodiments, the QKD link 106 can form a connection between the Q-switch 202 of the HPC system 102 and the Q-switch 204 of the HPC system 104. For instance, in one or more embodiments, the QKD link 106 can be connected to a quantum-enabled port 206 of the Q-switch 202 and a quantum-enabled port 208 of the Q-switch 204. The quantum-enabled port 206 can be, for example, a hardware interface associated with hardware (e.g., electro-optical hardware) and/or software to facilitate one or more QKD protocols for quantum communication via the QKD link 106. Furthermore, the quantum-enabled port 208 can also be, for example, a hardware interface associated with hardware (e.g., electro-optical hardware) and/or software to facilitate one or more QKD protocols for quantum communication via the QKD link 106. It is to be appreciated that, in certain embodiments, the Q-switch 202 and/or the Q-switch 204 can include more than one quantum-enabled port.

According to one or more embodiments, the Q-switch 202 can additionally include a network port 210. Additionally or alternatively, the Q-switch 204 can additionally include a network port 212. The network port 210 can be communicatively coupled to one or more network switches of the HPC system 102 via a classical link. The classical link associated with the network port 210 can be a classical network communication channel. For example, the classical link associated with the network port 210 can be associated with classical computing. In one or more embodiments, the classical link associated with the network port 210 can be an optical communication channel (e.g., a transparent fiber optical connection) that transmits data (e.g., pulses of infrared light) encoded via bits. In one or more other embodiments, the classical link associated with the network port 210 can be an electronic communication channel (e.g., a copper connection) that transmits data encoded via bits. The network port 210 can be, for example, a hardware interface associated with hardware (e.g., electro-optical hardware) and/or software to facilitate one or more communication protocols for classical network communication via the classical link associated with the network port 210. Furthermore, the network port 210 can also be, for example, a hardware interface associated with hardware (e.g., electro-optical hardware) and/or software to facilitate one or more communication protocols for classical communication via the classical link associated with the network port 210.

The network port 212 can be communicatively coupled to one or more network switches of the HPC system 104 via a classical link. The classical link associated with the network port 212 can be a classical network communication channel. For example, the classical link associated with the network port 212 can be associated with classical computing. In one or more embodiments, the classical link associated with the network port 212 can be an optical communication channel (e.g., a transparent fiber optical connection) that transmits data (e.g., pulses of infrared light) encoded via bits. In one or more other embodiments, the classical link associated with the network port 212 can be an electronic communication channel (e.g., a copper connection) that transmits data encoded via bits. The network port 212 can be, for example, a hardware interface associated with hardware (e.g., electro-optical hardware) and/or software to facilitate one or more communication protocols for classical network communication via the classical link associated with the network port 212. Furthermore, the network port 212 can also be, for example, a hardware interface associated with hardware (e.g., electro-optical hardware) and/or software to facilitate one or more communication protocols for classical communication via the classical link associated with the network port 212.

According to one or more embodiments, the Q-switch 202 and/or the Q-switch 204 can be configured to manage QKD protocol communications. For example, the Q-switch 202 and/or the Q-switch 204 can include hardware and/or software configured to facilitate execution of one or more quantum protocols. Furthermore, the Q-switch 202 and/or the Q-switch 204 can additionally or alternatively be configured to manage one or more keys and/or one or more communications with one or more servers of the HPC system 104. For example, the Q-switch 202 can additionally or alternatively include hardware and/or software configured to recognize requests for key establishment from one or more servers and/or one or more Q-switches in the HPC system 102. Furthermore, the Q-switch 204 can additionally or alternatively include hardware and/or software configured to recognize requests for key establishment from one or more servers and/or one or more Q-switches in the HPC system 104. Additionally or alternatively, the Q-switch 202 can include hardware and/or software configured to manage and/or transmit one or more keys to one or more servers of the HPC system 102 after successful quantum key exchange.

Furthermore, the Q-switch 204 can include hardware and/or software configured to manage and/or transmit one or more keys to one or more servers of the HPC system 104 after successful quantum key exchange.

FIG. 3 illustrates a system 100" that facilitates a quantum key distribution enabled intra-datacenter network according to one or more embodiments of the present disclosure. The system 100" illustrates an exemplary embodiment associated with the system 100. The system 100" includes the HPC system 102 and the HPC system 104. In an embodiment, the HPC system 102 includes a QKD device 302 and the HPC system 104 includes a QKD device 304. According to one or more embodiments, the QKD link 106 can form a connection between the QKD device 302 of the HPC system 102 and the QKD device 304 of the HPC system 104. For instance, in one or more embodiments, the QKD link 106 can be connected to a quantum-enabled port 306 of the QKD device 302 and a quantum-enabled port 308 of the QKD device 304. The quantum-enabled port 306 can be, for example, a hardware interface associated with hardware (e.g., electro-optical hardware) and/or software to facilitate one or more QKD protocols for quantum communication via the QKD link 106. Furthermore, the quantum-enabled port 308 can also be, for example, a hardware interface associated with hardware (e.g., electro-optical hardware) and/or software to facilitate one or more QKD protocols for quantum communication via the QKD link 106. It is to be appreciated that, in certain embodiments, the QKD device 302 and/or the QKD device 304 can include more than one quantum-enabled port.

According to one or more embodiments, the QKD device 302 can additionally include a network port 310. Additionally or alternatively, the QKD device 304 can additionally include a network port 312. The network port 310 can be communicatively coupled to a network switch 314 of the HPC system 102 via a classical link 316. For instance, the classical link 316 can be connected to the network port 310. The classical link 316 can be a classical network communication channel. For example, the classical link 316 can be associated with classical computing. In one or more embodiments, the classical link 316 can be an optical communication channel (e.g., a transparent fiber optical connection) that transmits data (e.g., pulses of infrared light) encoded via bits. In one or more other embodiments, the classical link 316 can be an electronic communication channel (e.g., a copper connection) that transmits data encoded via bits. The network port 310 can be, for example, a hardware interface associated with hardware (e.g., electro-optical hardware) and/or software to facilitate one or more communication protocols for classical network communication via the classical link 316. Furthermore, the network port 310 can also be, for example, a hardware interface associated with hardware (e.g., electro-optical hardware) and/or software to facilitate one or more communication protocols for classical communication via the classical link 316.

According to one or more embodiments, the classical link 316 can also be connected to a network port 318 of the network switch 314. The network port 318 can be, for example, a hardware interface associated with hardware (e.g., electro-optical hardware) and/or software to facilitate one or more communication protocols for classical network communication via the classical link 316. Furthermore, the network port 318 can also be, for example, a hardware interface associated with hardware (e.g., electro-optical hardware) and/or software to facilitate one or more communication protocols for classical communication via the classical link 316. In one embodiment, the network port 318 can be a datapath port of the network switch 314 that is associated with data processing. In another embodiment, the network port 318 can be a management port of the network switch 314 associated with management and/or configuration of the network switch 314. According to one or more embodiments, the QKD device 302 can be configured to manage QKD protocol communications. For example, the QKD device 302 can include hardware and/or software configured to facilitate execution of one or more quantum protocols. Furthermore, the network switch 314 can be configured to manage one or more keys and/or one or more communications with one or more servers of the HPC system 102. For example, the network switch 314 can include hardware and/or software configured to recognize requests for key establishment from one or more servers and/or the QKD device 302. Additionally or alternatively, the network switch 314 can include hardware and/or software configured to manage and/or transmit one or more keys to one or more servers of the HPC system 102 after successful quantum key exchange.

According to one or more embodiments, the network port 312 can be communicatively coupled to a network switch 320 of the HPC system 104 via a classical link 322. For instance, the classical link 322 can be connected to the network port 312. The classical link 322 can be a classical network communication channel. For example, the classical link 322 can be associated with classical computing. In one or more embodiments, the classical link 322 can be an optical communication channel (e.g., a transparent fiber optical connection) that transmits data (e.g., pulses of infrared light) encoded via bits. In one or more other embodiments, the classical link 322 can be an electronic communication channel (e.g., a copper connection) that transmits data encoded via bits. The network port 312 can be, for example, a hardware interface associated with hardware (e.g., electro-optical hardware) and/or software to facilitate one or more communication protocols for classical network communication via the classical link 322. Furthermore, the network port 312 can also be, for example, a hardware interface associated with hardware (e.g., electro-optical hardware) and/or software to facilitate one or more communication protocols for classical communication via the classical link 322.

According to one or more embodiments, the classical link 322 can also be connected to a network port 324 of the network switch 320. The network port 324 can be, for example, a hardware interface associated with hardware (e.g., electro-optical hardware) and/or software to facilitate one or more communication protocols for classical network communication via the classical link 322. Furthermore, the network port 324 can also be, for example, a hardware interface associated with hardware (e.g., electro-optical hardware) and/or software to facilitate one or more communication protocols for classical communication via the classical link 322. In one embodiment, the network port 324 can be a datapath port of the network switch 320 that is associated with data processing. In another embodiment, the network port 324 can be a management port of the network switch 320 associated with management and/or configuration of the network switch 320. According to one or more embodiments, the QKD device 304 can be configured to manage QKD protocol communications. For example, the QKD device 304 can include hardware and/or software configured to facilitate execution of one or more quantum protocols. Furthermore, the network switch 320 can be configured to manage one or more keys and/or one or more communications with one or more servers of the HPC system 104. For example, the network switch 320 can include hardware and/or software configured to recognize requests for key establishment from one or more servers and/or the QKD device 304. Additionally or alternatively, the network switch 320 can include hardware and/or software configured to manage and/or transmit one or more keys to one or more servers of the HPC system 104 after successful quantum key exchange.

FIG. 4 illustrates a system 400 that facilitates QKD connectivity between more than two HPC systems according to one or more embodiments of the present disclosure. According to various embodiments, the system 400 provides a ring topology with point-to-point connections to reach a particular destination HPC system through one or more intermediate HPC systems. In an embodiment illustrated in FIG. 4, the system 400 includes an HPC system 402, an HPC system 404, an HPC system 406, an HPC system 408, an HPC system 410, and/or an HPC system 412. The HPC system 402 can be communicatively coupled to the HPC system 404 via a QKD link 414; the HPC system 404 can be communicatively coupled to the HPC system 406 via a QKD link 416; the HPC system 406 can be communicatively coupled to the HPC system 408 via a QKD link 418; the HPC system 408 can be communicatively coupled to the HPC system 410 via a QKD link 420; the HPC system 410 can be communicatively coupled to the HPC system 412 via a QKD link 422; and/or the HPC system 412 can be communicatively coupled to the HPC system 402 via a QKD link 424. In one or more embodiments, the HPC system 402 can correspond to the HPC system 102 and the HPC system 404 can correspond to the HPC system 104. Furthermore, in one or more embodiments, the QKD link 414 can correspond to the QKD link 106.

In an exemplary embodiment, the HPC system 402 can reach the HPC system 404 (e.g., a destination HPC system) via the QKD link 414. In another exemplary embodiment, the HPC system 402 can reach the HPC system 406 (e.g., a destination HPC system) via the QKD link 414, the HPC system 404 and/or the QKD link 416. In yet another exemplary embodiment, the HPC system 402 can reach the HPC system 408 (e.g., a destination HPC system) via the QKD link 414, the HPC system 404, the QKD link 416, the HPC system 406 and/or the QKD link 418. Alternatively, the HPC system 402 can reach the HPC system 408 (e.g., a destination HPC system) via the QKD link 424, the HPC system 412, the QKD link 422, the HPC system 410 and/or the QKD link 420. In yet another exemplary embodiment, the HPC system 402 can reach the HPC system 412 (e.g., a destination HPC system) via the QKD link 424. In yet another exemplary embodiment, the HPC system 402 can reach the HPC system 422 (e.g., a destination HPC system) via the QKD link 424, the HPC system 412 and/or the QKD link 422.

FIG. 5 illustrates a system 500 that facilitates QKD connectivity between more than two HPC systems according to one or more embodiments of the present disclosure. According to various embodiments, the system 500 provides multiple point-to-point connections among HPC systems. In an embodiment illustrated in FIG. 5, the system 500 includes an HPC system 502, an HPC system 504, an HPC system 506, and/or an HPC system 508. The HPC system 502 can be communicatively coupled to the HPC system 504 via a QKD link 510. Additionally, the HPC system 502 can be communicatively coupled to the HPC system 506 via a QKD link 512. In addition to the HPC system 504 being communicatively coupled to the HPC system 502 via the QKD link 510, the HPC system 504 can be additionally communicatively coupled to the HPC system 508 via a QKD link 514 according to one or more embodiments. Furthermore, in addition to the HPC system 506 being communicatively coupled to the HPC system 502 via the QKD link 512, the HPC system 506 can be additionally communicatively coupled to the HPC system 508 via a QKD link 516 according to one or more embodiments. In one or more embodiments, the HPC system 502 can correspond to the HPC system 102 and the HPC system 504 can correspond to the HPC system 104. Furthermore, in one or more embodiments, the QKD link 510 can correspond to the QKD link 106.

In an exemplary embodiment, the HPC system 502 can reach the HPC system 504 (e.g., a destination HPC system) via the QKD link 510. In another exemplary embodiment, the HPC system 502 can reach the HPC system 506 (e.g., a destination HPC system) via the QKD link 512. In yet another exemplary embodiment, the HPC system 502 can reach the HPC system 508 (e.g., a destination HPC system) via the QKD link 512, the HPC system 506, and/or the QKD link 516. As such, in one or more embodiments, a particular HPC system (e.g., the HPC system 502) can reach more than one other HPC system (e.g., the HPC system 504 or the HPC system 506) via a direct QKD link.

FIG. 6 illustrates a system 600 that facilitates QKD connectivity between more than two HPC systems according to one or more embodiments of the present disclosure. According to various embodiments, the system 600 provides a crossbar optical switch to facilitate different connections among HPC systems. In an embodiment illustrated in FIG. 6, the system 600 includes an HPC system 602, an HPC system 604, an HPC system 606, and/or an HPC system 608. The system 600 also includes an optical switch 610. The optical switch 610 can be, for example, a crossbar optical switch that includes switches arranged in a matrix configuration to facilitate connections among the HPC system 602, the HPC system 604, the HPC system 606 and/or the HPC system 608. For example, the optical switch 610 can include multiple input communication channels and multiple output communication channels that form a crossed pattern of interconnections to facilitate connections among the HPC system 602, the HPC system 604, the HPC system 606, and/or the HPC system 608.

The HPC system 602 can be communicatively coupled to the HPC system 604, the HPC system 606, and/or the HPC system 608 via the optical switch 610. For example, the HPC system 602 can be communicatively coupled to the optical switch 610 via a QKD link 612. Furthermore, the optical switch 610 can be communicatively coupled to the HPC system 604 via a QKD link 614. As such, the HPC system 602 can be communicatively coupled to the HPC system 604 via the QKD link 612, the optical switch 610, and the QKD link 614. In another example, the HPC system 602 can be communicatively coupled to the optical switch 610 via the QKD link 612. Furthermore, the optical switch 610 can be communicatively coupled to the HPC system 606 via a QKD link 616. As such, the HPC system 602 additionally or alternatively can be communicatively coupled to the HPC system 606 via the QKD link 612, the optical switch 610 and the QKD link 616. In yet another example, the HPC system 602 can be communicatively coupled to the optical switch 610 via the QKD link 612. Furthermore, the optical switch 610 can be communicatively coupled to the HPC system 608 via a QKD link 618. As such, the HPC system 602 additionally or alternatively can be communicatively coupled to the HPC system 608 via the QKD link 612, the optical switch 610 and the QKD link 618.

FIG. 7 illustrates a system 700 that facilitates QKD connectivity between more than two HPC systems according to one or more embodiments of the present disclosure. According to various embodiments, the system 700 provides an add-drop topology associated with multiple crossbar optical switches to facilitate different connections among HPC systems. In an embodiment illustrated in FIG. 7, the system 700 includes an HPC system 702, an HPC system 704, an HPC system 706, and/or an HPC system 708. The system 700 also includes an optical switch 710, an optical switch 712, an optical switch 714, and/or an optical switch 716. The optical switch 710, the optical switch 712, the optical switch 714, and/or the optical switch 716 can be, for example, a crossbar optical switch that includes switches arranged in a matrix configuration to facilitate connections among the HPC system 702, the HPC system 704, the HPC system 706, and/or the HPC system 708. For example, the optical switch 710, the optical switch 712, the optical switch 714, and/or the optical switch 716 can include multiple input communication channels and multiple output communication channels that form a crossed pattern of interconnections to facilitate connections among the HPC system 702, the HPC system 704, the HPC system 706, and/or the HPC system 708.

The HPC system 702 can be communicatively coupled to the HPC system 704, the HPC system 706, and/or the HPC system 708 via the optical switch 710, the optical switch 712, the optical switch 714, and/or the optical switch 716. For example, the HPC system 702 can be communicatively coupled to the optical switch 710 via a QKD link 718. The optical switch 710 can be communicatively coupled to the optical switch 712 via a QKD link 720. Furthermore, the optical switch 712 can be communicatively coupled to the HPC system 704 via a QKD link 722. As such, the HPC system 702 can be communicatively coupled to the HPC system 704 via the QKD link 718, the optical switch 710, the QKD link 720, the optical switch 712 and/or the QKD link 722. In another example, the HPC system 702 can be communicatively coupled to the optical switch 710 via the QKD link 718. The optical switch 710 can be communicatively coupled to the optical switch 712 via the QKD link 720. The optical switch 712 can be communicatively coupled to the optical switch 714 via a QKD link 724. Furthermore, the optical switch 714 can be communicatively coupled to the HPC system 706 via a QKD link 726. As such, the HPC system 702 can additionally or alternatively be communicatively coupled to the HPC system 706 via the QKD link 718, the optical switch 710, the QKD link 720, the optical switch 712, the QKD link 724, the optical switch 714 and/or the QKD link 726. In yet another example, the HPC system 702 can be communicatively coupled to the optical switch 710 via the QKD link 718. The optical switch 710 can be communicatively coupled to the optical switch 716 via the QKD link 728. The optical switch 716 can be communicatively coupled to the HPC system 708 via a QKD link 730. As such, the HPC system 702 can additionally or alternatively be communicatively coupled to the HPC system 708 via the QKD link 718, the optical switch 710, the QKD link 728, the optical switch 716 and/or the QKD link 730.

FIG. 8 illustrates a system 800 that facilitates QKD connectivity between more than two HPC systems according to one or more embodiments of the present disclosure. According to various embodiments, the system 800 provides scaling of a number of QKD links in a datacenter network beyond loss budget limitations of a QKD channel by cascading HPC systems in a multi-hop topology. Furthermore, according to various embodiments, an HPC system can be equipped with more than one QKD interface to facilitate interconnection with more than one neighboring HPC system. To facilitate illustrating a multi-hop topology, the system 800 illustrated in FIG. 8 includes the system 600, a system 600' and a system 600". However, it is to be appreciated, that in one or more alternate embodiments, the system 600, the system 600' and/or the system 600" can be replaced with another type of system such as, for example, the system 400, the system 500, the system 700, and/or another system. The system 600 includes the HPC system 602, the HPC system 604, the HPC system 606, the HPC system 608, and the optical switch 610. In an embodiment, the HPC system 604 of the system 600 is communicatively coupled to the HPC system 602, the HPC system 606, and/or the HPC system 608 of the HPC system 600 via the QKD link 614 and a combination of the optical switch 610, the QKD link 612, the QKD link 616, and/or the QKD link 618 of the system 600. Furthermore, in an embodiment, the HPC system 604 of the system 600 is communicatively coupled to the system 600' (e.g., the HPC system 608 of the system 600') via a QKD link 802. The system 600' can be a system configured similarly to the system 600 that provides a crossbar optical switch to facilitate different connections among HPC systems. Additionally or alternatively, in an embodiment, the HPC system 606 of the system 600 is communicatively coupled to the HPC system 602, the HPC system 604 and/or the HPC system 608 of the HPC system 600 via the QKD link 616 and a combination of the optical switch 610, the QKD link 612, the QKD link 614, and/or the QKD link 618 of the system 600. Furthermore, in an embodiment, the HPC system 606 of the system 600 is communicatively coupled to the system 600" (e.g., the HPC system 602 of the system 600") via a QKD link 804. The system 600" can also be a system configured similarly to the system 600 that provides a crossbar optical switch to facilitate different connections among HPC systems.

FIG. 9 illustrates a system 900 that facilitates QKD communication via a fat-tree datacenter architecture according to one or more embodiments of the present disclosure. According to various embodiments, the system 900 provides classical links within a computer cluster and QKD links external to the computer cluster. For instance, the system 900 includes a computer cluster 902. The computer cluster 902 includes, for example, a set of connected computers (e.g., a set of connected processor cores, a set of connected servers, and/or a set of connected routers) associated with classical links 906. Furthermore, the computer cluster 902 is communicatively coupled to a server 904 via a QKD link 908. In certain embodiments, the computer cluster 902 can be associated with an access layer of a datacenter network and the server 904 can be associated with an aggregation layer of the datacenter network. In one or more embodiments, the server 904 can be additionally communicatively coupled to a server 910 via a classical link 912. In certain embodiments, the server 910 can be associated with a core layer of the datacenter network.

FIG. 10 illustrates a system 1000 that facilitates QKD communication via another fat-tree datacenter architecture according to one or more embodiments of the present disclosure. According to various embodiments, the system 1000 provides classical links within a computer cluster and QKD links external to the computer cluster. For instance, the system 1000 includes a computer cluster 1002. The computer cluster 1002 includes, for example, a set of connected computers (e.g., a set of connected processor cores, a set of connected servers, and/or a set of connected routers) associated with classical links 1006. Furthermore, the computer cluster 1002 is communicatively coupled to a server 1004 via an optical switch 1008 associated with QKD links. In certain embodiments, the computer cluster 1002 can be associated with an access layer and/or an aggregation of a datacenter network. Furthermore, the server 1004 can be associated with a core layer of the datacenter network.

FIG. 11 illustrates a system 1100 that facilitates QKD communication via a dragonfly datacenter topology according to one or more embodiments of the present disclosure. The system 1110 includes a group of routers 1102, a group of routers 1104 and/or a group of routers 1106. The group of routers 1102, the group of routers 1104 and/or the group of routers 1106 can include, for example, one or more spine routers connected to one or more other groups of routers. The group of routers 1102, the group of routers 1104 and/or the group of routers 1106 can additionally include, for example, one or more leaf routers connected to a respective spine router. A leaf router can be connected to one or more servers and/or one or more storage devices. In an embodiment, connections within the group of routers 1102 (and similarly the group of routers 1104 and/or the group of routers 1106) can be classical links 1108. Furthermore, the group of routers 1102 can be communicatively coupled to the group of routers 1104 and/or the group of routers 1106 via QKD links 1110.

FIG. 12 is a flowchart illustrating an example method for facilitating quantum key distribution in accordance with one or more embodiments of the present disclosure. It will be understood that each block of the flowcharts, and combinations of blocks in the flowcharts, may be implemented by various means. In some example embodiments, certain ones of the operations herein may be modified or further amplified as described below. Moreover, in some embodiments additional optional operations may also be included. It should be appreciated that each of the modifications, optional additions, or amplifications described herein may be included with the operations herein either alone or in combination with any others among the features described herein. The operations illustrated in FIG. 12 may, for example, be performed by an example computing system 1300 (shown in FIG. 13) that is embedded in a datacenter network system, such as a Q-switch (e.g., the Q-switch 202 and/or the Q-switch 204) and/or a QKD device (e.g., the QKD device 302 and/or the QKD device 304) of the datacenter network system. In some embodiments, the computing system 1300 is a firmware computing system embedded in a Q-switch (e.g., the Q-switch 202 and/or the Q-switch 204) and/or a QKD device (e.g., the QKD device 302 and/or the QKD device 304) of a datacenter network system. In one or more embodiments, one or more of the operations illustrated in FIG. 12 may, for example, be performed by a Q-switch (e.g., the Q-switch 202 and/or the Q-switch 204) and/or a QKD device (e.g., the QKD device 302 and/or the QKD device 304). In one or more embodiments, at operation 1202, the computing system 1300 configures a first device of a first High performance computing (HPC) system to execute a quantum communication protocol. In one or more embodiments, at operation 1204, the computing system 1300 configures a second device of a second HPC system to execute the quantum communication protocol. In one or more embodiments, at operation 1206, the computing system 1300 facilitates one or more quantum key distribution (QKD) communications via a QKD link connected to the first HPC system and the second HPC system. For example, in one or more embodiments, one or more keys and/or other data can be communicated via quantum communication associated with the QKD link.

FIG. 13 illustrates the computing system 1300 that may be embedded in a datacenter network system. In some cases, the computing system 1300 may be a firmware computing system communicatively coupled with, and configured to control, one or more circuit modules in the datacenter network system. For example, the computing system 1300 may be a firmware computing system communicatively coupled with one or more circuit modules, such as a Q-switch (e.g., the Q-switch 202 and/or the Q-switch 204) and/or a QKD device (e.g., the QKD device 302 and/or the QKD device 304). The computing system 1300 may include or otherwise be in communication with a processor 1310, a memory circuitry 1320, and communication circuitry 1330. In some embodiments, the processor 1310 (which may include multiple or co-processors or any other processing circuitry associated with the processor) may be in communication with the memory circuitry 1320. The memory circuitry 1320 may comprise non-transitory memory circuitry and may include one or more volatile and/or non-volatile memories. In some examples, the memory circuitry 1320 may be an electronic storage device (e.g., a computer readable storage medium) configured to store data that may be retrievable by the processor 1310. In some examples, the data stored in the memory 620 may include the quantum communication protocol data, or the like for enabling the apparatus to carry out various functions or methods in accordance with embodiments of the present invention, described herein.

In some examples, the processor 1310 may be embodied in a number of different ways. For example, the processor may be embodied as one or more of various hardware processing means such as a microprocessor, a coprocessor, a digital signal processor (DSP), a controller, or a processing element with or without an accompanying DSP. The processor 1310 may also be embodied in various other processing circuitry including integrated circuits such as, for example, an FPGA (field programmable gate array), a microcontroller unit (MCU), an ASIC (application specific integrated circuit), a hardware accelerator, or a special-purpose electronic chip. Furthermore, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining, and/or multithreading. In some embodiments, the processor 1310 is a microprocessor.

In an example embodiment, the processor 1310 may be configured to execute instructions, such as computer program code or instructions, stored in the memory circuitry 1320 or otherwise accessible to the processor 1310. Alternatively or additionally, the processor 1310 may be configured to execute hard-coded functionality. As such, whether configured by hardware or software instructions, or by a combination thereof, the processor 1310 may represent a computing entity (e.g., physically embodied in circuitry) configured to perform operations according to an embodiment of the present invention described herein. For example, when the processor 1310 is embodied as an ASIC, FPGA, or similar, the processor may be configured as hardware for conducting the operations of an embodiment of the invention. Alternatively, when the processor 1310 is embodied to execute software or computer program instructions, the instructions may specifically configure the processor 1310 to perform the algorithms and/or operations described herein when the instructions are executed. However, in some cases, the processor 1310 may be a processor of a device (e.g., a mobile terminal or a fixed computing device) specifically configured to employ an embodiment of the present invention by further configuration of the processor using instructions for performing the algorithms and/or operations described herein. The processor 1310 may further include a clock, an arithmetic logic unit (ALU) and logic gates configured to support operation of the processor 1310, among other things.

The computing system 1300 may optionally also include the communication circuitry 1330. The communication circuitry may be any means embodied in either hardware or a combination of hardware and software that is configured to receive and/or transmit data from/to a network and/or any other device or module in communication with the computing system 1300. In this regard, the communication interface may include, for example, supporting hardware and/or software for enabling communications. As such, for example, the communication circuitry 1330 may include a communication modem and/or other hardware/software for supporting communication via cable, universal serial bus (USB), integrated circuit receiver, or other mechanisms.

Many modifications and other embodiments of the present inventions set forth herein will come to mind to one skilled in the art to which these inventions pertain having the benefit of the teachings presented in the foregoing descriptions and the associated drawings. Therefore, it is to be understood that the present inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A system, comprising:
a first quantum key distribution (QKD) device that comprises a first quantum-enabled port and a first network port;
a second QKD device that comprises a second quantum-enabled port and a second network port, and
a third QKD device that comprises a third quantum-enabled port and a third network port,
wherein the first quantum-enabled port of the first QKD device is communicatively coupled to the second quantum-enabled port of the second QKD device via a QKD link associated with quantum communication, wherein the first network port of the first QKD device is communicatively coupled to a first network switch via a first classical link associated with classical network communication, wherein the second network port of the second QKD device is communicatively coupled to a second network switch via a second classical link associated with classical network communication, and wherein the third quantum-enabled port of the third QKD device is communicatively coupled to the first QKD device or the second QKD device via a QKD link associated with quantum communication.

2. The system of claim 1, wherein the QKD link communicatively coupling the third quantum-enabled port of the third QKD device to the first QKD device is a second QKD link associated with quantum communication, wherein the system further comprises:
a fourth QKD device that comprises a fourth quantum-enabled port and a fourth network port, wherein the fourth quantum-enabled port of the fourth QKD device is communicatively coupled to the second QKD device via a third QKD link associated with quantum communication.

3. The system of claim 1, wherein the QKD link communicatively coupling the first quantum-enabled port of the first QKD device to the second quantum-enabled port of the second QKD device comprises a first QKD link and a second QKD link, wherein the first quantum-enabled port of the first QKD device is communicatively coupled to an optical switch via the first QKD link, and wherein the optical switch is communicatively coupled to the second quantum-enabled port of the second QKD device via the second QKD link.

4. The system of claim 1, wherein the QKD link communicatively coupling the first quantum-enabled port of the first QKD device to the second quantum-enabled port of the second QKD device comprises a first QKD link and a second QKD link, wherein the first quantum-enabled port of the first QKD device is communicatively coupled to a first optical switch via the first QKD link, wherein the first optical switch is communicatively coupled to a second optical switch, and wherein the second optical switch is communicatively coupled to the second quantum-enabled port of the second QKD device via the second QKD link.

5. The system of claim 1, wherein the first QKD device is a first QKD-enabled top of rack (ToR) switch, and wherein the second QKD device is a second QKD-enabled ToR switch.

6. The system of claim 1, wherein the first QKD device is a first QKD-enabled end of rack (EoR) switch, and wherein the second QKD device is a second QKD-enabled EoR switch.

7. A system, comprising:
a first quantum key distribution (QKD) switch that comprises a first quantum-enabled port;
a second QKD switch that comprises a second quantum-enabled port; and
a third QKD switch that comprises a third quantum-enabled port,
wherein the first quantum-enabled port of the first QKD switch is communicatively coupled to the second quantum-enabled port of the second QKD switch via a QKD link associated with quantum communication, wherein the third quantum-enabled port of the third QKD switch is communicatively coupled to the first QKD switch or the second QKD switch via a QKD link associated with quantum communication, and wherein the first QKD switch comprises first QKD hardware and the second QKD switch comprises second QKD hardware configured to facilitate the quantum communication via the QKD link.

8. The system of claim 7, wherein the QKD link communicatively coupling the third quantum-enabled port of the third QKD switch to the first QKD switch is a second QKD link associated with quantum communication, and wherein the system further comprises:
a fourth QKD switch that comprises a fourth quantum-enabled port, wherein the fourth quantum-enabled port of the fourth QKD switch is communicatively coupled to the second QKD switch via a third QKD link associated with quantum communication.

9. The system of claim 7, wherein the QKD link communicatively coupling the first quantum-enabled port of the first QKD switch to the second quantum-enabled port of the second QKD switch comprises a first QKD link and a second QKD link, wherein the first quantum-enabled port of the first QKD switch is communicatively coupled to an optical switch via a the first QKD link, and wherein the optical switch is communicatively coupled to the second quantum-enabled port of the second QKD switch via the second QKD link.

10. The system of claim 7, wherein the QKD link communicatively coupling the first quantum-enabled port of the first QKD switch to the second quantum-enabled port of the second QKD switch comprises a first QKD link and a second QKD link, wherein the first quantum-enabled port of the first QKD switch is communicatively coupled to a first optical switch via a the first QKD link, wherein the first optical switch is communicatively coupled to a second optical switch, and wherein the second optical switch is communicatively coupled to the second quantum-enabled port of the second QKD switch via the second QKD link.

11. The system of claim 7, wherein the first QKD switch is a first QKD-enabled top of rack (ToR) switch, and wherein the second QKD switch is a second QKD-enabled ToR switch.

12. The system of claim 7, wherein the first QKD switch is a first QKD-enabled end of rack (EoR) switch, and wherein the second QKD switch is a second QKD-enabled EoR switch.

13. A system, comprising:
a first quantum key distribution (QKD) device that comprises a first quantum-enabled port;
a second QKD device that comprises a second quantum-enabled port, wherein the first quantum-enabled port of the first QKD device is communicatively coupled to the second quantum-enabled port of the second QKD device via a QKD link associated with quantum communication;
a third QKD device that comprises a third quantum-enabled port, wherein the third quantum-enabled port of the third QKD device is communicatively coupled to the first QKD device or the second QKD device via a QKD link associated with quantum communication; and
a network switch communicatively coupled to the first QKD device via a classical link associated with classical network communication, wherein the first QKD device is configured to manage a QKD protocol for the quantum communication, and wherein the network switch is configured to manage the classical network communication.

14. The system of claim 13, wherein the QKD link communicatively coupling the third quantum-enabled port of the third QKD device to the first QKD device is a second QKD link associated with quantum communication, and wherein the system further comprises:
a fourth QKD device that comprises a fourth quantum-enabled port, wherein the fourth quantum-enabled port of the fourth QKD device is communicatively coupled to the second QKD device via a third QKD link associated with quantum communication.

15. The system of claim 13, wherein the QKD link communicatively coupling the first quantum-enabled port of the first QKD device to the second quantum-enabled port of the second QKD device comprises a first QKD link and a second QKD link, wherein the first quantum-enabled port of the first QKD device is communicatively coupled to an optical switch via the first QKD link, and wherein the optical switch is communicatively coupled to the second quantum-enabled port of the second QKD device via the second QKD link.

16. The system of claim 13, wherein the QKD link communicatively coupling the first quantum-enabled port of the first QKD device to the second quantum-enabled port of the second QKD device comprises a first QKD link and a second QKD link, wherein the first quantum-enabled port of the first QKD device is communicatively coupled to a first optical switch via the first QKD link, wherein the first optical switch is communicatively coupled to a second optical switch, and wherein the second optical switch is communicatively coupled to the second quantum-enabled port of the second QKD device via the second QKD link.

17. The system of claim 13, wherein the network switch is a first network switch, wherein the classical link is a first classical link, and wherein the system further comprises:
    a second network switch communicatively coupled to the second QKD device via a second classical link associated with classical network communication.

* * * * *